Nov. 28, 1967　　　E. J. H. FIALA ET AL　　　3,354,906
CONTROL MECHANISM
Filed Sept. 17, 1964
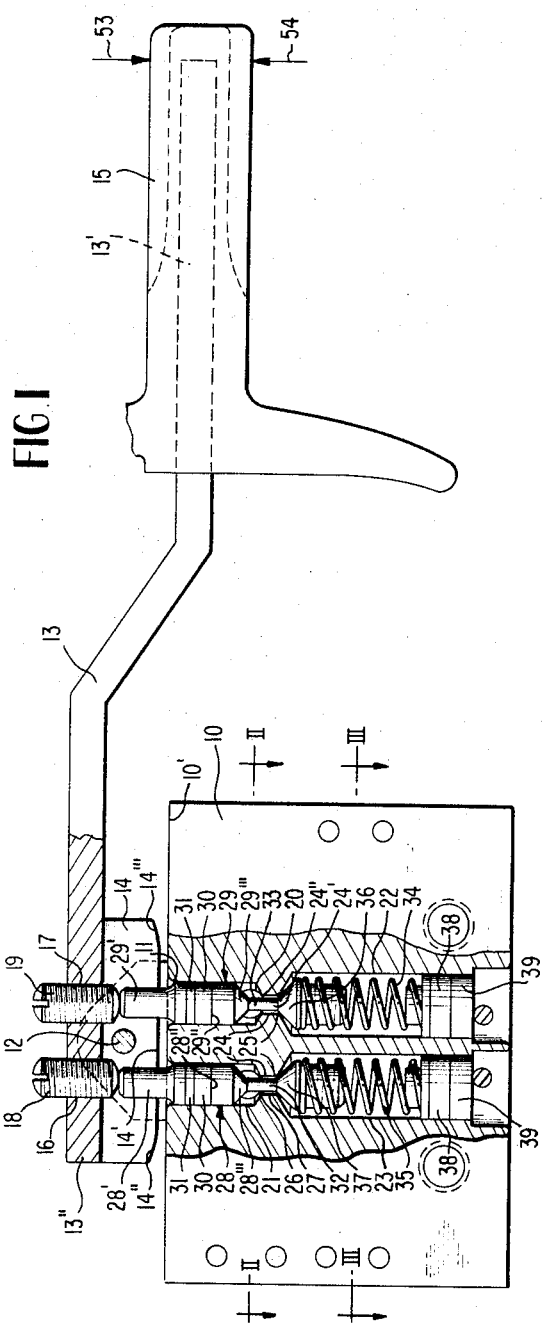
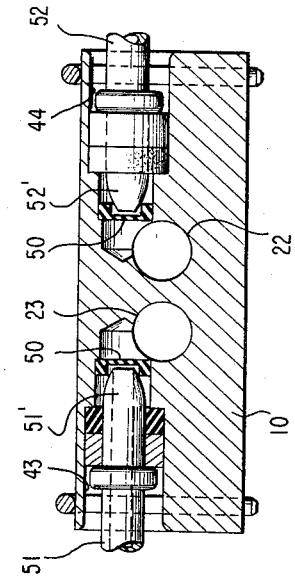
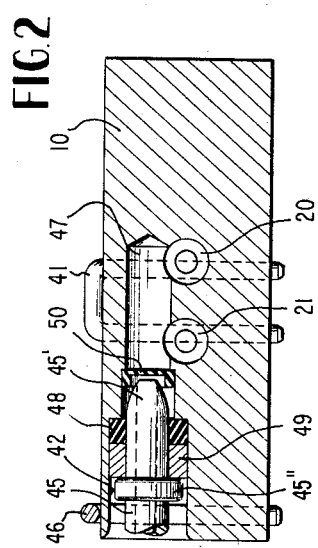
INVENTORS
ERNST J. H. FIALA
RUDOLF ANDRES
WILLI JUROWSKI
BY
Dicke & Craig
ATTORNEYS

United States Patent Office 3,354,906
Patented Nov. 28, 1967

3,354,906
CONTROL MECHANISM
Ernst J. H. Fiala, Berlin, Rudolf Andres Sindelfingen, and Willi Jurowski, Fellbach, Germany, assignors to Daimler-Benz Aktiengesellschaft, Stuttgart-Untertürken, Germany
Filed Sept. 17, 1964, Ser. No. 397,177
Claims priority, application Germany, Sept. 20, 1963, D 42,522
15 Claims. (Cl. 137—596.2)

The present application discloses subject matter in common with the copending application that is now Patent 3,158,178 issued on Nov. 24, 1964 for a "Shifting Mechanism" to Ernst J. H. Fiala and Rudolf Andres, inventors of the present application. The present invention relates to a control mechanism constructed as switching or shifting device for hydraulic or pneumatic actuating mechanisms, especially in motor vehicles, with at least three connecting bores provided in the housing of the control mechanism which are adapted to be selectively connected with each other by way of valve controlled bores, whereby the valve bodies subjected to spring forces are actuated by shifting pins which are coaxial with the valve bodies and which cooperate with a shifting lever pivotally connected externally at the housing of the switching or shifting mechanism.

The known prior art control mechanism which have at least three connecting bores arranged in the housing, of which one connecting bore is provided as connection for a pipe line connected with a pressure-medium storage tank and of which a further connecting bore is provided as connection for a connecting line between an adjusting motor and a control mechanism, have the disadvantage that in case of damage or destruction of only one line, the entire hydraulic installation, with which the pressure medium is at pressures of from 200 to 300 atü (atmospheres) for the actuation of the actuating mechanisms provided in a motor vehicle, has to be turned off or shut down in order to enable an interchange of the damaged line or pipe. It is therefore not possible with the use of such prior art control mechanisms to maintain the pressure normally prevailing in the other pipe lines or adjusting motors during repair of the damaged one.

The present invention is predicated on the task to create a control mechanism that eliminates the aforementioned shortcomings.

The present invention solves the underlying problems in that the flow or passage apertures which are arranged between the bores of the housing directly receiving or accommodating the shifting pins and the valve bodies and which are normally adapted to be closed by the valve bodies, can be closed off or blocked independently of the valve bodies. This takes place, for example, in that a means adjusting the play between a shifting pin and the corresponding valve body serves as additional closure or blocking means for the flow or passage aperture. The part of the shifting pin cooperating with the valve body may thereby be constructed also as valve body whose valve seat on the side of the housing is constituted by the same web portion resulting during manufacture of the bore and delimiting the flow or passage aperture, as is also provided for the sealing seat of the spring-stressed valve body.

According to the present invention the means adjusting the play between the shifting pin and valve body and simultaneously serving as the indirect closure or blocking means of the flow or passage aperture can be constructed as threaded pin arranged in the shifting lever.

It is possible by the construction of the control mechanism in accordance with the present invention, to undertake repairs in the hydraulic installation without shutting down the entire hydraulic installation. By reason of the fact that according to the present invention, the bores arranged in the housing serve directly for the accommodation of the shifting pins and of the valve body together with the spring thereof, the manufacturing expenditures for the control mechanisms has been decreased considerably which led to a considerable decrease in the costs.

Accordingly, it is an object of the present invention to provide a control mechanism for fluid-energized actuating installations, especially in motor vehicles, which eliminates the aforementioned shortcomings and drawbacks encountered with the prior art constructions by simple means that are relatively inexpensive in manufacture, easy to assemble and of relatively reduced overall costs.

It is another object of the present invention to provide a control mechanism for fluid-actuated installations which is so constructed and arranged as to permit, by a simple adjustment, repairs in any part of the fluid system without requiring the complete de-energization or shutdown of the entire pressurized system.

Still another object of the present invention resides in the provision of a control mechanism for selectively actuating fluid-driven motors which not only permits maintenance of the pressure in the system even in case of need of repair in some part of the pressurized system but also offers superior versatility in use and application.

A further object of the present invention resides in the provision of a control mechanism of the type described above which is not only extremely simple in construction and easy to adjust but requires relatively few parts that can be readily manufactured thereby resulting in considerable reduction in the costs thereof.

These and other objects, features, and advantages of the present invention will become more obvious from the following description when taken in connection with the accompanying drawing which shows, for purposes of illustration only, one embodiment in accordance with the present invention, and wherein FIGURE 1 is an elevational view, partly in cross section, through a control mechanism constructed as switching or shifting device in accordance with the present invention;

FIGURE 2 is a cross sectional view taken along line II—II of FIGURE 1, and

FIGURE 3 is a cross sectional view taken along line III—III of FIGURE 1.

Referring now to the drawing wherein like reference numerals are used throughout the various views to designate like parts, reference numeral 10 designates therein the housing of a control mechanism constructed as switching or shifting device for a hydraulic actuating mechanism in a motor vehicle while reference numeral 11 designates a two-partite bearing lug or support connected with the housing 10.

The bearing support 11 is provided with a bolt 12 which extends through a web portion 14, secured at a shifting lever 13 which projects beyond the housing 10; the bolt 12 also forms the pivot axis of the shifting lever 13. The surface of the web portion 14 facing the housing 10 is subdivided into a plane or flat section 14' extending parallel to the shifting lever 13 and into two beveled off or tapered sections 14" and 14'''. The beveled off or tapered sections 14" and 14''' serve for purposes of limiting the pivot movements of the shifting lever 13 about the bolt 12. A handle 15 of T-shape in longitudinal cross section is slipped over and secured to the free end 13' of the shifting lever 13 projecting far beyond the housing 10. The handle 15 may consist of a conventional plastic material. Threaded bores 16 and 17 are provided at the end 13" of the shifting lever 13 near the support lug 11 into which are screwed threaded pins 18 and 19 whose surfaces facing the housing 10 are of arcuate or curved construction.

Bores 20 to 23 are provided in the housing 10 which are disposed symmetrically to the plane of the housing 10 extending perpendicularly to the axis of the bolt 12. The bores 20 to 23 are separated from one another by annularly-shaped web portions 24 obtained during manufacture of two bores of different size, which web portions 24 are provided in turn with passage or flow apertures 25 having sealing seats 26 and 27 and also sealing seats 24″ and 24′. The diameter of the bores 20 and 21 extending parallel to each other is smaller than the diameter of the coaxial bores 22 and 23.

Axially displaceable shifting pins generally designated by reference numerals 28 and 29 are arranged in the bores 20 and 21 facing the bearing support 11. The ends 28′ and 29′ of the shifting pins 28 and 29 facing the bearing support 11 extend beyond the edge 10′ of the housing 10 and in the center position of the shifting lever 13 contact the arcuate surfaces of the threaded pins 18 and 19 in a point like manner. The shifting pins 28 and 29 are provided in the center portions thereof with annular grooves 28″ and 29″ for the accommodation of sealing rings 30 and 31 made of elastic yielding material. The conical portion of each of the shifting pins 28 and 29 facing the web portion 24 is constructed as valve body 28‴ and 29‴ and is provided with a plunger 32 and 33, respectively, projecting into the passage or flow apertures 25.

Valve bodies 36 and 37 which are subjected to the forces of springs 34 and 35 are disposed within the bores 22 and 23 adjoining the bores 20 and 21. The springs 34 and 35 are supported with the ends thereof opposite the valve bodies 36 and 37 against closure plugs 39 provided with sealing rings 38 which are secured within the bores 22 and 23 by a single U-shaped bow member 41 (FIGURE 2). The conically constructed valve bodies 36 and 37 may consist of a polyamide whereby the weight of the control mechanism is reduced.

In addition to the valve-controlled bores 20 to 23 there are provided within the housing 10 connecting bores 42, 43 and 44 (FIGURES 2 and 3) extending at right angles to the bores 20 to 23.

The connecting bore 42 (FIGURE 2) serves for the accommodation of a pipe line 45 which connects the control mechanism with an adjusting motor (not shown) for an actuating mechanism. The end 45′ of the pipe line 45 adapted to be plugged into the connecting bore 42 and adapted to be secured therein by a U-shaped securing bow 46 terminates in a connecting bore 47 which connects with each other the two bores 20 and 21. The end 45′ of the pipe line 45 equipped with a collar 45″ is provided with a metallic abutment or support ring 49 in addition to a sealing ring 48 made of rubber-like material which support ring 49 is pressed into the connecting bore 42.

The connecting bore 43 (FIGURE 3) serves for the accommodation of a pipe line 51 which connects the control mechanism with a storage tank or pump (not shown) for the pressureless pressure medium. The connecting bore 43 terminates in the bore 23. The end 51′ of the pipe line 51 adapted to be plugged into the connecting bore 43 and secured therein is constructed and secured in the same manner as the end 45′ of the pipe line 45.

The connecting bore 44 (FIGURE 3) is provided for a pipe line 52 which establishes the connection between the control mechanism and a pressure medium storage tank (not shown) or a fluid pump (not shown).

The end 52′ of the pipe line adapted to be plugged into the connecting bore 44 is also provided with a sealing ring and a support ring and is secured by a U-shaped securing bow. The connecting bore 44 terminates in the bore 22. Filters 50 with a mesh size of 30µ which keep harmful dirt particles from the valves.

OPERATION

The operation of the control mechanism of the present invention constructed as switching or shifting device is as follows:

After the pipe lines 45, 51 and 52 are plugged in with the ends 45′, 51′ and 52′ thereof into the connecting bores 42, 43, and 44 and are secuerd therein as shown in FIGURES 2 and 3, the pressure medium flowing from the pressure medium tank (not shown) through the line 52 reaches the bore 22 of the housing 10. The pressure medium together with the spring 34 thereby presses the valve body 36 against the valve seat 24′ of the web portion 24 forming the passage or flow aperture 25.

The shifting lever 13 is in the center position thereof with valves 36 and 37 closed whereby the plungers 32 and 33 of the shifting pins 28 and 29 projecting into the passage or flow apertures 25 have a slight spacing from the surfaces of the valve bodies 36 and 37 facing the same, which is necessary in order that the valve bodies 36 and 37 are able to seat securely against the valve seats of the web portion 24. This play between the two parts can be influenced and adjusted by the threaded pins 18 and 19.

Upon pivoting the shifting lever 13 about the bolt 12 in the direction of arrow 53 (FIGURE 1), the shifting pin 29 is displaced by the threaded pin 19 whereby the axial movement of the shifting pin 29 is limited by the web portion 14 whose surface 14‴ comes into abutment against the edge 10′ of the housing 10. By this limitation is avoided that the initially opened passage or flow aperture 25 is closed again by the valve body 29‴ of the shifting pin 29. Upon pivoting the shifting lever 13, the plunger 33 of the shifting pin 29 now presses and lifts the valve body 36 against the force of the spring 34 and against the pressure of the pressure medium off its sealing seat 24′ and thus opens the path to the pressure medium through the flow aperture 25, the connecting bore 47 (FIGURE 2) and the pipe line 45 to the adjusting motor which actuates an actuating mechanism. If the shifting lever 13 is released, then the latter pivots back into the center position thereof since the force of the spring 34 in conjunction with the pressure medium presses the valve body 36 in a sudden, almost instantaneous manner against the sealing seat 24′, during which time the shifting pin 29 is displaced upwardly by the plunger 33.

The pressure medium now remains for such length of time in the pipe line 45 and in the adjusting motor until the shifting lever 13 is pivoted in the direction of arrow 54 (FIGURE 1). The threaded pin 18 thereby presses against the shifting pin 28 whose plunger 32 lifts the valve body 37 from its sealing seat 27 against the force of spring 35. As a result thereof, the path for the pressure medium disposed in the adjusting motor is opened up through the pipe line 45, the connecting bore 47 and the bore 23 to the tank or pump (not shown) for the pressureless pressure medium, which is forced back into the storage tank by means of a spring force acting on the piston in the adjusting motor or through any other conventional means. Upon release of the spring lever 13, the latter returns to its center position as a result of the force of spring 35.

The threaded pins 18 and 19 arranged in the shifting lever 13 not only serve alone for purposes of adjusting the play between the ends of the plungers 32 and 33 and the valve bodies 37 and 36 subjected to the forces of the springs 35 and 34 in order that always a complete sealing of the passage or flow apertures 25 is assured, but additionally have to fulfill another task.

If, for example, the adjusting motor connected with the pipe line 45 has to be exchanged by reason of damage or wear, which with the use of the known control mechanisms was possible only if the entire hydraulic installation was shut off, according to the present invention, in contrast thereto, by screwing-in the threaded pins 18 and 19, the shifting pins 28 and 29 are pressed with the valve bodies 28‴ and 29‴ against the sealing seats 26 and 24″ of the web portions 24. As a result thereof, even with an attempted actuation of the shifting lever 13, no connection will be established any longer between the pressure medium tank by way of pipe line 52, the bore 27, connecting bore 47 and the pipe line 45 to the adjusting mechanism. The damaged adjusting motor can now be disassembled and removed without difficulty without having to shut down or de-energize the entire hydraulic installation which includes a large number of control mechanisms and adjusting motors. The threaded pins 18 and 19 are utilized also as closure securing means if any pipe line is damaged by external influences and has to be closed off against the pressure medium tank.

The threaded pins 18 and 19 also serve as lock securing means for any adjusting motor, if any actuating mechanism coordinated thereto is to be locked in any given condition. In that case the threaded pins are also screwed into the threaded bores 16 and 17 either together or alone, and more particularly in such a manner that the shifting lever 13 can no longer be pivoted. If an excessive pressure builds up in the pipe line 45 closed off by the valve body 37 or in the adjusting motor connected therewith, which results for example, from a temperature increase, then the valve body 37 which is subjected to the force of the spring 35 together with its valve seat 27 is effective as pressure relief valve.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A fluid valve, comprising: a housing having a first fluid passage and a second fluid passage; separate first and second valve means for normally closing each of said passages, respectively, separate first and second shifting means for each of said passages, respectively, mounted for movement toward and away from the corresponding first and second valve means for opening the corresponding valve means by movement in one direction to a first position; separate additional third and fourth valve means, each drivingly connected with a corresponding one of said first and second shifting means, respectively, for closing the corresponding passage only after movement of the corresponding shifting means in said one direction a substantial distance past said first position to said second position; first actuator means for selectively and alternately moving each of said shifting means to said first position; and second actuator means for moving said additional third and fourth valve means into their closed position and said shifting means into their second position, and for simultaneously holding both of said additional third and fourth valve means in their closed position and said shifting means in their second position.

2. The device of claim 1, wherein said housing includes a first bore a second bore, and a third bore; said first fluid passage connecting said first and third bores; and said second fluid passage connecting said second and third bores.

3. The device of claim 2, wherein each of said fluid passages includes an annular inwardly projecting portion provided with opposite axially spaced annular valve seats; each of said first and second valve means including a movable valve member normally seated on a corresponding one of said annular valve seats; and said third and fourth valve means each including a movable valve member engageable with the corresponding other of said annular valve seats.

4. The device of claim 3, wherein each of said first and second shifting means includes a shifting rod extending through its corresponding annular projection with fluid clearance.

5. The device of claim 4, wherein each of said shifting rods is fixedly attached at one end to a corresponding one of said first and second valve means movable members and fixedly attached at its other end to a corresponding one of said third and fourth valve means movable members.

6. The device of claim 5, wherein said first and second valve means are normally closed spring biased one way valves.

7. The device of claim 6, wherein said first actuator means includes a lever mounted on said housing for pivoting movement in one direction for actuating one of said shifting means and pivoting movement in the other direction for actuating the other of said shifting means.

8. The device of claim 7, including screw threaded means for threaded adjustment in one direction to first change the length of the actuating stroke of said first actuator means, and thereafter, upon continued movement in said one direction, closing said third and fourth valve means to constitute said second actuator means.

9. The device of claim 8, wherein said screw threaded means comprises a first and second pin threaded through said lever for driving engagement with said third and fourth valve means, first and second shifting means, and first and second valve means, respectively in series.

10. The device of claim 1, wherein each of said fluid passages includes an annular inwardly projecting portion provided with opposite axially spaced annular valve seats; each of said first and second valve means including a movable valve member normally seated on a corresponding one of said annular valve seats; and said third and fourth means each including a movable valve member engageable with the corresponding other of said annular valve seats.

11. The device of claim 10, wherein each of said first and second shifting means includes a shifting rod extending through its corresponding annular projection with fluid clearance, wherein each of said shifting rods is fixedly attached at one end to a corresponding one of said first and second valve means movable members and fixedly attached at its other end to a corresponding one of said third and fourth valve means movable members.

12. The device of claim 1, wherein said first and second valve means are normally closed spring biased one way valves.

13. The device of claim 1, wherein said first actuator means includes a lever mounted on said housing for pivoting movement in one direction for actuating one of said shifting means and pivoting movement in the other direction for actuating the other of said shifting means.

14. The device of claim 1, including screw threaded means for threaded adjustment in one direction to first change the length of the actuating stroke of said first actuator means, and thereafter, upon continued movement in said one direction, closing said third and fourth valve means to constitute said second actuator means.

15. The device of claim 14, wherein said screw threaded means comprises a first and second pin threaded through said lever for driving engagement with said third and fourth valve means, first and second shifting means and first and second valve means, respectively in series.

References Cited

UNITED STATES PATENTS

| | | | |
|---|---|---|---|
| 618,454 | 1/1899 | Davis | 137—614.14 |
| 2,156,823 | 5/1939 | Stettner | 137—550 |
| 3,095,900 | 7/1963 | Newhall | 251—368 X |
| 3,158,178 | 11/1964 | Fiala et al. | 137—596.2 |

M. CARY NELSON, *Primary Examiner.*

R. J. MILLER, *Assistant Examiner.*